United States Patent

Jonasson et al.

[11] Patent Number: 5,836,391
[45] Date of Patent: Nov. 17, 1998

[54] WELLBORE SAND CONTROL METHOD

[75] Inventors: Ralph G. Jonasson; Kevin Rispler, both of Edmonton; Ernest H. Perkins, Sherwood Park, all of Canada

[73] Assignee: Alberta Oil Sands Technology & Research Authority, Edmonton, Canada

[21] Appl. No.: 680,829

[22] Filed: Jul. 16, 1996

Related U.S. Application Data

[63] Continuation-in-part of Ser. No. 506,169, Jul. 25, 1995, abandoned.

[51] Int. Cl.$^6$ .................................................. F21B 33/138
[52] U.S. Cl. ................................................................ 166/295
[58] Field of Search ................................... 166/285, 292, 166/295

[56] References Cited

U.S. PATENT DOCUMENTS 3,593,798  7/1971  Darley ........................ 166/295
5,480,947  1/1996  Oishi et al. ..................... 525/509

Primary Examiner—William P Neuder
Attorney, Agent, or Firm—Sheridan Ross P.C.

[57] ABSTRACT

A slug of solution, comprising a linear polymer such as polysulfone, polyethylene terephthalate or polyimide dissolved in a "good" solvent, such as morpholine, dimethylformamide m-cresol or dimethylsulfoxide, respectively, is emplaced in the near-wellbore region of an unconsolidated sand reservoir. A second slug comprising a poor solvent for the polymer, such as water or water+2-methanol is pumped into the region to contact the first slug. The linear polymer is precipitated and forms a three-dimensional network of interconnected strands extending through the fluid flow channels between the sand grains. The network functions to consolidate the sand without significantly damaging permeability. Petroleum and other fluids can then be produced without loose sand being entrained in the fluids. If necessary, this permeable network of plastic threads can be removed by re-injecting a slug of the good solvent to re-dissolve the plastic and reform the original linear polymer solution.

2 Claims, 3 Drawing Sheets

WELLBORE SAND CONTROL METHOD

CROSS-REFERENCE TO RELATED APPLICATION

This application is a continuation-in-part of application Ser. No. 08/506,169 filed on Jul. 25, 1995, now abandoned.

FIELD OF THE INVENTION

This invention relates to an in situ plastic consolidation method for constraining sand or gravel particles forming a subterranean reservoir.

BACKGROUND OF THE INVENTION

There are some hydrocarbon reservoirs that are referred to as unconsolidated sands. The sand grains are not cemented together or are only poorly cemented. When contained fluids are produced from the reservoir through a wellbore, there is some tendency for the sand grains to move with the flow and enter the wellbore. The sand can plug the wellbore or erode the producing equipment.

The problem is significant and as a result extensive research has been carried out to develop ways to alleviate it.

In situ plastic consolidation is one technique which has been applied for this purpose. In general, this technique involves emplacing a polymer oligomer in the flow channels of the near-wellbore region of the reservoir and then cross-linking or hardening the oligomer. (The "near-wellbore region" is a zone extending out radially from the wellbore a short distance—perhaps two or three feet.)

More particularly, a slug of a first solution, comprising the polymer oligomer dissolved in a viscosity-reducing solvent, is displaced down the wellbore and into the near-wellbore region. A liquid slug containing a curing agent is then pumped into the region to contact the first slug. The well is then temporarily shut in, to allow the polymer to harden.

The patent literature contains many examples of this general system. Typical polymers used are epoxy, furfuryl alcohol and phenol/formaldehyde.

Now, there are a number of difficulties that require consideration in connection with plastic consolidation. Many of the prior art patents are specifically directed at proposing solutions for these difficulties. The difficulties include:

Maintaining adequate residual permeability in the near-bore region. The hardened plastic can block the flow channels. Since the plastic is cross-linked, there is no effective way to remove it to restore permeability;

Developing a consolidated near-wellbore sand/polymer matrix that has good compressive strength, which is an indicator of good resistance to erosion by the flow of produced fluids;

Developing a plastic framework that has some residual structural strength in the event that sand grains are dissolved, which is a possibility in thermal projects where steam is being injected;

Wetting the sand so that the cross-linked polymer resin binds sand grains together; and Developing a consolidated near-wellbore sand-polymer composite that does not shrink or disintegrate with time.

It is therefore desirable to develop a novel process which yields a consolidated sand/polymer matrix that is characterized by good residual permeability, good compressive strength, and a plastic framework that survives sand dissolution. In addition, it is desirable to use a plastic which can be reversibly dissolved in a solvent, so that, in the event of plugging, the plastic can be removed.

At this point, it is appropriate to refer to a prior art technology which has been developed in connection with the manufacture of microporous plastic membranes used for pressure driven filtration. This technology is described in the Handbook of Industrial Membrane Technology, published by Noyes Publications, Chapter 1. The technology involves contacting a first solution, comprising a polymer dissolved in a "good" organic solvent, with a second "poor" solvent in which the polymer is insoluble. The polymer will precipitate in the form of a porous, permeable solid. To applicants' knowledge, this technology has not been applied in situ in a subterranean reservoir. The technology is applied in a specific manner in connection with the present invention.

SUMMARY OF THE INVENTION

The present invention is based on combining the following:

emplacing, by displacement down a wellbore, a slug of polymer-carrying solution in the near-bore region of an unconsolidated sand or gravel reservoir, to locate the solution in the flow channels between the sand or gravel particles, the solution comprising a linear polymer dissolved in a first organic component that is a good solvent for the polymer, said good solvent preferably being miscible with water and substantially non-reactive with the polymer and, preferably, with the reservoir minerals and fluids;

then injecting a slug of a poor solvent for the polymer into the near-bore region to contact the first slug, said poor solvent being miscible with the good solvent, and precipitating solid linear polymer from solution to form a three-dimensional network of interconnected strands, said strands extending through the fluid flow channels, to consolidate the particles while retaining residual permeability.

The solvents and polymer need to "match" in order to achieve the required network. Stated otherwise, one needs to test combinations of polymer and good and poor solvents to determine if a combination yields the three-dimensional, fish net-like network. For example, in our best mode we have matched:

morpholine as the good solvent, polysulfone as the polymer, with a polymer loading of 5 to 20% by weight of the solution, and water as the poor solvent to achieve the network in a consolidated sand that is characterized by residual permeability that is typically about 50% of the original permeability and a level of unconfined compressive strength such that failure occurs between 100 kPa and 4000 kPa. The viscosity of the polymer solution varies between 20 and 3800 centipoise over the given concentration range.

In the product of this best mode embodiment, when tested in sand, one finds:

that the strands have a slight clearance from the surfaces of the sand particles, which clearances appear to be the main contributing factor to a desirable level of residual permeability;

that the network combines with the sand to create a compressively strong composite matrix, without bonding to the particles; and that if fluid is flowed through the consolidated product, the sand remains affixed in the composite matrix.

It will be appreciated that it will be a difficult practical problem to sample a subterranean near-wellbore region to determine if the described network has been formed. The invention as claimed is therefore to be construed as being restricted with respect to reagents to those which perform, when applied to a sand sample to yield the network in a laboratory experiment carried out in accordance with a Standard Test Procedure set forth below. Also, it may be possible to collect downwell samples by a procedure known as side-track drilling.

Broadly stated, the invention is a process for consolidating the near-bore region of an unconsolidated subterranean reservoir containing reservoir fluid and being formed by discrete sand or gravel particles having communicating fluid flow channels extending therebetween to provide fluid flow permeability, comprising: (a) emplacing a liquid slug of a first solution in the near-bore region, said solution comprising a linear polymer dissolved in a good solvent for the polymer; (B) then injecting a liquid slug of a poor solvent for the polymer, said poor solvent being miscible in the good solvent, into the near-bore region to contact the first slug and precipitate linear polymer to consolidate the particles of the near-bore region while retaining sufficient residual permeability to enable production of the reservoir fluid; the solvents and polymer having been selected on the following basis: (i) the good solvent being substantially non-reactive with the polymer, (ii) the polymer being non-miscible with water and with petroleum and substantially non-reactive with the reservoir solids and fluids, (iii) the combination of solvents and polymer used being operative, if tested under laboratory conditions in accordance with the Standard Test Procedure set forth in the disclosure, to form a three-dimensional network of interconnected strands in a sand sample, said strands extending through fluid flow channels in the sample.

DESCRIPTION OF THE PREFERRED EMBODIMENT

Figure 1:
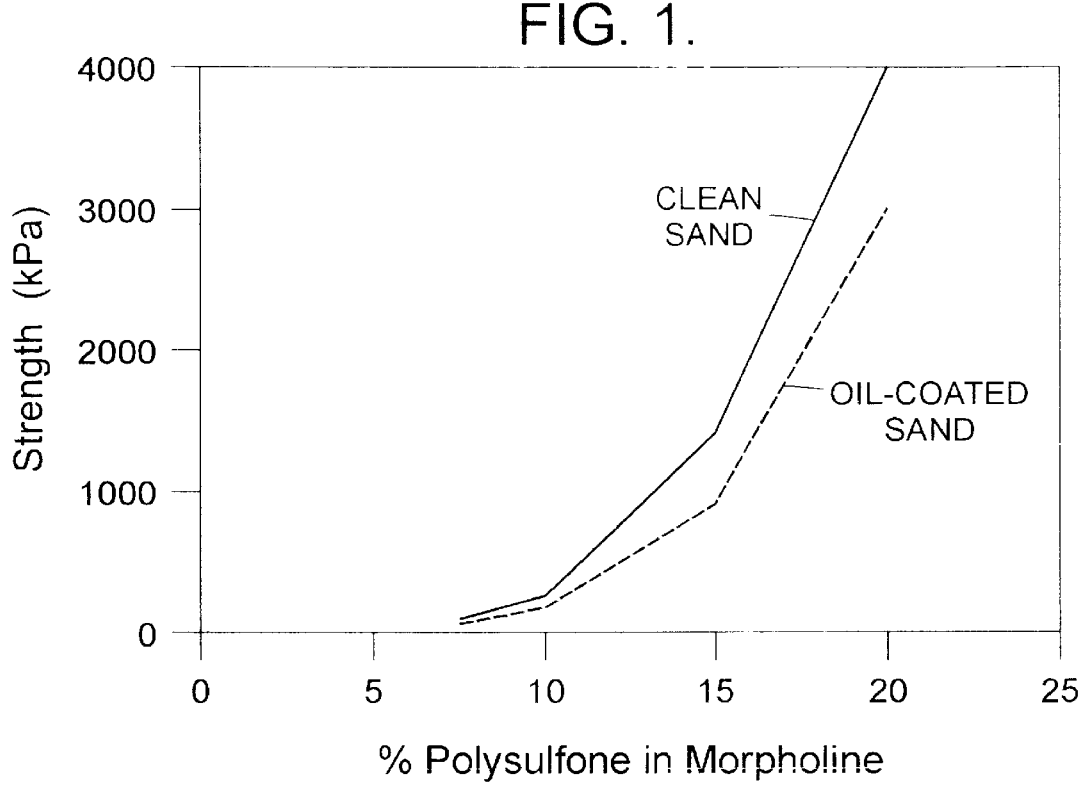
FIG. 1 is a plot showing the increase in compressive strength of consolidated sand as the percentage of polymer (polysulfone) in the good solvent (morpholine) is increased.

Polymers which can be used with reservoir temperatures less than 100° C. include polysulfone, polystyrene, polyvinyl/chloride, polymethyl/methacrylate, polyethylene terephthalate, polyimide and polyphenylene oxide.

Good solvents which can be used which are miscible with water include acetone, acetonitrile, 2-butoxyethanol, dimethylformamide, dimethylsulfoxide, dioxane, ethylmethylketone, m-cresol, morpholine and tetrahydrafuran. Halogenated solvents may be used if they are miscible with water, provided that environmental problems are not an issue.

The good solvent preferably should be non-reactive with respect to reservoir minerals or fluids or the polymer.

The precipitating or poor solvent may be water or brine or a mixture of water with an alcohol such as 2-methanol.

Alternatively, the poor solvent may be organic, such as white oil, kerosene or petroleum ether (also called hexanes). In the case of an organic poor solvent, useful good solvents include acetone acetonitrile, cyclohexanone, diethylether, dimethylformamide, dimethylsulfoxide, dioxane, m-cresol, methyl t-butyl ether, nitrobenzene, phenol, tetrahydrofuran, toluene, or xylene.

Polymers which can be used for steam enhanced oil recover ("EOR") applications include such engineering plastics as polyethylene terephthalate and polyimides, such as those based on 1,4-phenylenediamine and 3,3', 4,4'-benzophenonetetracarboxylic acid. Good solvents which can be used with these polymers include dimethylformamide, trifluoracetic acid, m-cresol, phenol, resorcinol or a substituted phenol which is a liquid at reservoir conditions. In this case, the poor solvent may be a low carbon number alcohol such as 2-methanol or a mixture of the alcohol with water.

Table I sets forth a group of recommended matched combinations which yield the desired network consolidation:

TABLE I

| Polymer | Good Solvent | Poor Solvent |
|---|---|---|
| Polyvinyl chloride | dimethylformamide | water |
| polyvinyl chloride | tetrahydrofuran | water |
| Polystyrene | morpholine | water |
| Polymethylmethacrylate | morpholine | water |
| Polysulfone | tetrahydrofuran | water |
| Polysulfone | morpholine | water |
| Polyethyleneterephthalate | phenol | water |
| Polyethyleneterephthalate | m-cresol | 50% aq. methanol |
| Polyimide | dimethylsulfoxide | 50% aq. methanol |

In principle, mixtures of solvents, as well as mixtures of polymers may also be used. For example, a mixture of polysulfone and polyvinyl chloride will dissolve in a mixture of tetrahydrofuran and morpholine. However, workers skilled in the craft will be aware that not all solvents are chemically compatible with each other, and that some polymers are not chemically compatible with some solvents.

We have found that the preferred polymer is a particular polysulfone based on bisphenol A and diphenylsulfone, (density=1.24 kg/L, molecular weight=50,000 Daltons; glass temperature=190° C.). We have found that the preferred solvent is morpholine, ($NHC_4H_8O$, density=0.999; m.p. −6° C.). The preferred poor solvent for this system is water or brine. The optimum concentration of polysulfone falls in the range 5–20% (wt/wt). The viscosity of the polysulfone solution varies between 20 and 3800 Cp over this concentration range. The exact best composition depends on the optimization for a particular application (based on compressive strength, final permeability, solution viscosity and cost).

Figure 5:
FIG. 5 is a photograph showing a consolidated sand "near-bore region" formed by injecting polysulfone/morpholine as a first slug and water as a second slug in a sand bed, after removal of the unconsolidated sand in the bed.

We have found empirically that 200 mL of 20% (wt/wt) polysulfone in morpholine will consolidate 160 mL of fine sand. With well-packed sand in an isotropic stress field, the final distribution of polymer is uniform around the injection port and homogeneous throughout the consolidated zone. The transition between consolidated and unconsolidated sand is sharp, (1–5 mm) (see FIG. 5).

We have found that the specific gravities of the polymer solution and the poor solvent should be within 5% of each other. In experiments in which there was a significant difference in specific gravities, channelling of the polymer solution was observed. This resulted in the deposition of a dense polymer solid within a narrow zone, rather than evenly through the near-bore region of the sand bed.

It is anticipated that this polymer consolidation treatment can be used in many applications, such as vertical and horizontal wells. Packers may be used to block off that section to be treated. The treatment should be effective in consolidating reservoirs producing conventional crude oil, heavy oil, natural gas and water. The treatment may also be used to help extend the life of injection wells. If a polymer is selected with a sufficiently high softening point (or melting point), and sufficiently good resistance to hydrolysis, the treatment can be used in steam EOR operations, such as those involving cyclic steam and steam drive.

The invention is exemplified by the following examples:

EXAMPLE 1

Preparation of Samples for Strength Testing

Samples of consolidated sand were prepared by injecting into clean sand, solutions of polysulfone in morpholine at concentrations of 5, 7.5, 10, 15 and 20% (wt/wt). The apparatus consisted of a steel cylinder, fitted with threaded end caps, both of which were fitted with Swagelok fittings. An HPLC pump and metal tubing was used to pump the liquids through the sand bed. The sand used was quartz sand (F-125 Ottawa, 0.1 to 0.2 mm diameter). The pressure was monitored using a pressure transducer. In preparing the solution, it was found that the polymer dissolved more quickly when the solution was stirred and heated to 60° C. Injection was carried out at room temperature. The volume of polymer solution as 50 mL, and the injection rate was 1120 mL/hr. A spacer of neat morpholine was used to eliminate precipitation in the fluid lines. The polysulfone was precipitated using an aqueous solution of 0.1 m sodium chloride plus 0.01 m $NaHCO_3$. The cores were easily removed from the core holder, and subjected to unconfined compressive strength tests. The results are shown in FIG. 1.

EXAMPLE 2

Preparation of Samples Containing Residual Oil for Strength Testing

Samples of consolidated sand were similarly prepared by injecting into oil-coated sand, solutions of polysulfone in morpholine at concentrations of 5, 7.5, 10, 15 and 20% (wt/wt). The sand was coated with Lloydminster crude by saturating the sand pack with the oil and then pumping water through the sand pack. The polysulfone was precipitated using dilute aqueous sodium chloride. The cores were removed from the core holder, and subjected to unconfined compressive strength tests. The results are shown in FIG. 1.

EXAMPLE 3

Sample Preparation for Determination of Changes in Permeability

Figure 2:
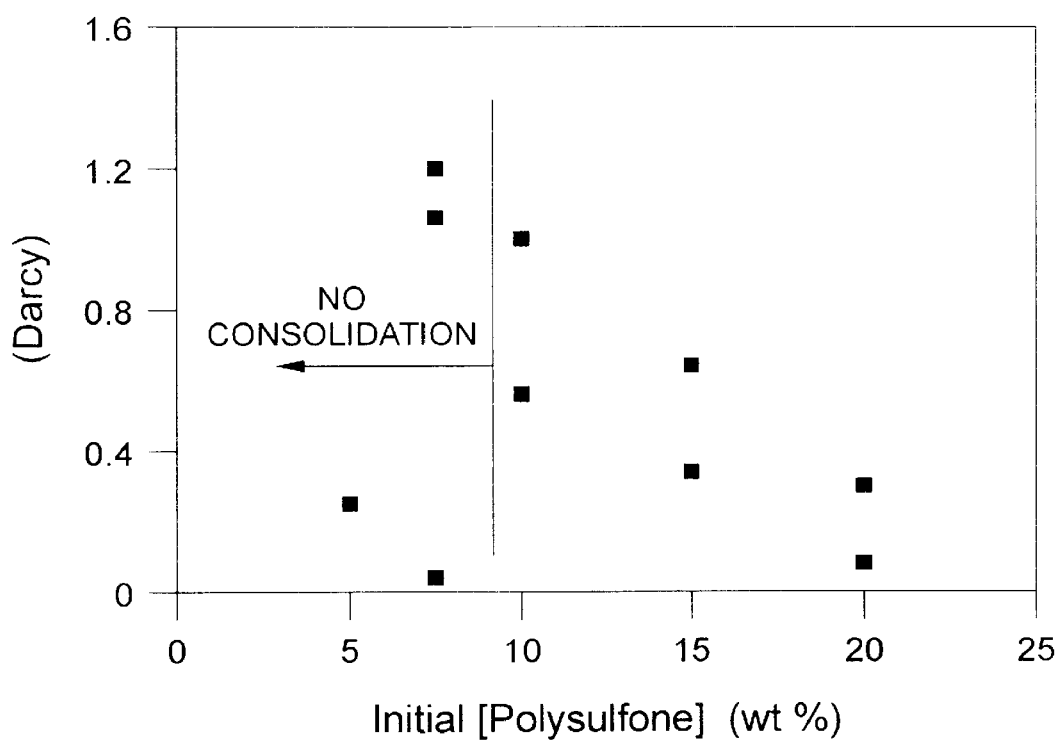
FIG. 2 is a plot showing the variance of residual permeability in consolidated sand as the polymer content in the good solvent is varied.

Samples of consolidated sand were prepared by injecting into sand polysulfone in morpholine at concentrations of 5, 7.5, 10, 15 and 20% (wt/wt) as described above. The flow rate and the pressure drop across the core holder were measured, and these results were used to calculate sand permeabilities before and after consolidation. The results are shown in FIG. 2.

EXAMPLE 4

Figure 3:
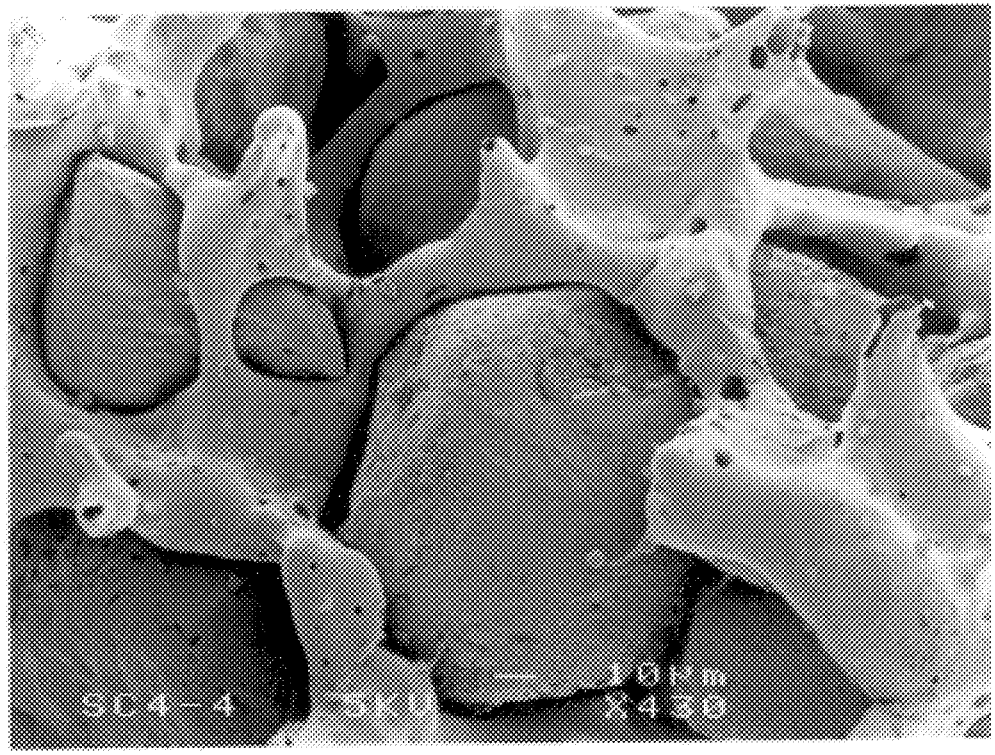
FIG. 3 is a scanning electron micrograph showing a polymer network formed in sand using the polysulfone/morpholine system.
Figure 4:
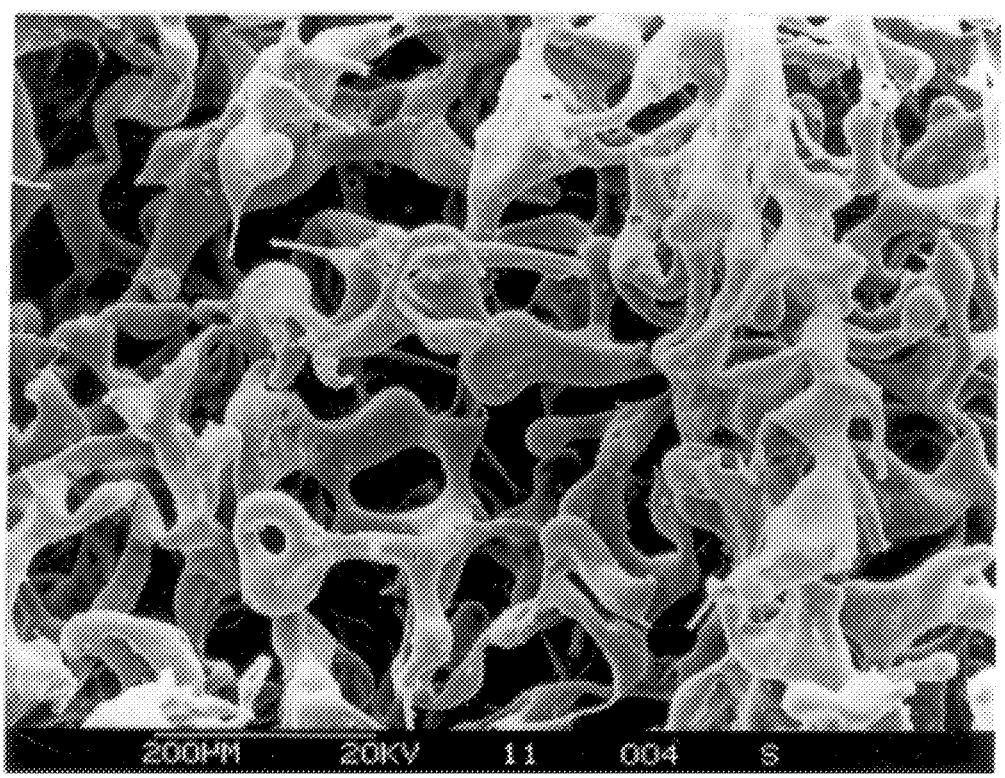
FIG. 4 is a scanning electron micrograph of a polymer network formed in sand using the polysulfone/morpholine system, the network being revealed after dissolving the sand grains in aqueous hydrofluoric acid.

Preparation of Consolidated Sand Sample for Microscopic and Electron Microscopic Examination Consolidated sand cores were prepared as in Example 1. A sub-sample was mounted on aluminum stubs and gold coated in preparation for scanning electron microscopic (SEM) examination. The results are shown in FIG. 3. Another sub-sample was treated with concentrated hydrofluoric acid at room temperature in a fume hood to completely dissolve the sand grains. The resulting spongy material was then thoroughly washed, dried, mounted and gold coated in preparation for SEM examination. The results are shown in FIG. 4. FIG. 3 shows that polymer forms solid strands around and between sand grains. There is little evidence of actually bonding of the polymer to the sand surfaces. FIG. 4 shows that the polymer network retained its integrity even though all the sand grains were dissolved.

EXAMPLE 5

Preparation of Unconfined Samples

A section of metal tubing was prepared with holes or perforations to provided in injection tube and imbedded in a sand bed packed into a 45 cm diameter pressure vessel (22.6 L capacity, containing 60 kg of F-125 Ottawa sand). Exit ports were installed some distance from the injection tube. The sand was pressurized using inflatable bladders located within the pressure cell. Then 200 mL of 20 wt % polysulfone in morpholine solutions were injected and precipitated using water. The pressure vessel was opened, and the unconsolidated sand was removed. The zone of consolidation was found to form uniformly around the injection tubing. See FIG. 5. Residual permeability of the consolidated sand core was confirmed by injecting water and observing the flow out of the consolidated section.

EXAMPLE 6

Testing of Consolidated Sand Beds for Breakdown During Fluid Flow

A core holder of 22 cm length and 7.6 cm internal diameter was fitted with slotted plates at one end, and filled with 1.5 Kg of sand. The lower 10% of the cylinder of sand, nearest the slotted end plate, was consolidated using polysulfone in morpholine solutions with concentrations of 5, 7.5, 10 and 15% (wt/wt). Following consolidation, water was pumped through the sand bed and out through the slotted end plate at various flow rates (see Table 2). Run times varied from 14 minutes to 186 minutes. Even at flow rates of 1600 mL/min., no sand was produced when the sand had been consolidated using a 10% polysulfone solution. Sand production was only observed when solutions containing 2.5% polysulfone or no polysulfone were used.

EXAMPLE 7

Samples of consolidated sand were prepared as in example 1. The cores were placed into stainless steel autoclave bombs, and heated with aqueous solutions of either 0.1% $H_2SO_4$ or 0.5% NaOH for 5 days at 150° C. In all cases, the compressive strengths of the cores were the same as the untreated cores, respectively, depending on the polymer concentration.

EXAMPLE 8

Two samples of consolidated sand were prepared using a solution of 20% polysulfone in morpholine. One of the cores was prepared with clean sand, the other with oil-coated sand. The cores were placed into a stainless steel autoclave bombs with brine, and heated at 100 C. for six months. After the test, the compressive strengths of the two cores were 2500 and 2700 kPa, respectively. This compares with the strength of 3500 kPa of a core prepared with 20% polysulfone in morpholine, which had not been subjected to hydrothermal treatment.

EXAMPLE 9

Polyimide was dissolved in dimethylsulfoxide to form solutions containing 10 wt/wt % polymer and 15 wt/wt % polymer. These solutions were used to consolidate sand, by precipitating the polymer with 50% aqueous methanol. Scanning electron microscopy confirmed that the consolidated cores were bonded by a three dimensional network of polymer strands.

EXAMPLE 10

Polyethylene terephthalate was dissolved in m-cresol to form a solution containing 20 wt/wt % polymer. This solution was used to consolidate sand by precipitating the polymer with 50% aqueous methanol. Scanning electron microscopy confirmed that the consolidated core was bonded with a three dimensional network of polymer strands.

EXAMPLE 11

Cores prepared in examples 9 and 10 using polyimide and polylethylene terephthalate were placed into autoclaves containing brine and Lloydminister crude oil (10% oil homogenized with brine). The autoclave bombs were heated to 250° C. for 5 days. After that period, the cores were completely disintegrated, and no trace of solid polymer could be seen. When heated in air to 250° C., the polyimide is stable. This suggests that polyimide underwent hydrolysis under aqueous conditions.

TABLE II

Sand Production From Critical Slot Apparatus For Various Consolidation Conditions

| Slot Size (mm) | % Polysulfone | Flow Rate (Max) (mL/min) | Injection P (kPa) | Sand Prod'n? |
|---|---|---|---|---|
| 0.30 | 0 | 450 | 82 | N |
| 0.71 | 0 | 16 | 7 | Y |
| 0.71 | 15 | 180 | 986 | N |
| 0.71 | 15 | 980 | 230 | N |
| 0.71 | 10 | 1600 | 360 | N |
| 0.71 | 7.5 | 625 | 430 | N |
| 0.71 | 5 | 1590 | 1810 | N |
| 0.71 | 2.5 | 1480 | 220 | Y |

A standard test procedure is now given to be used in establishing the solvents and polymers which are appropriate for the practice of the invention.

Standard Test Procedure in Sand Sample

Ottawa sand (or pure quartz sand) of specified particle size distribution is packed into a pressure vessel, fitted with an entrance port and as exit port. The sand is saturated with water. A solution of the linear polymer in solvent is injected such that the volume of the solution fully displaces the water from the sand core. A volume of neat solvent is injected to just displace the polymer solution contained within feed lines and pump. A sufficient quantity of an aqueous solution of 0.1% NaCl is injected to displace the good solvent and the spacer of neat solvent. The core is opened and the consolidated sand is removed.

The result should be that (1) at least part of the sand is consolidated into a self-supporting solid; (2) water or water/petroleum mixtures can be pumped through the core; (3) a sample removed from the consolidated sand and examined by microscopy (as in the scanning electron micrographs supplied with the disclosure) will show strands of solid plastic surrounding sand grains, without necessarily bonding to them, to form a three-dimensional network; (4) a sample removed from the consolidated sand and treated with concentrated aqueous hydrofluoric acid (HF) will yield a self-supporting, elastic sponge-like material containing no sand grains; (5) a sample removed from the consolidated sand when treated with a similar volume of hot (>50° C.) "good" solvent will cause the polymer to re-dissolve to yield the original unconsolidated sand.

The embodiments of the invention in which an exclusive property or privilege is claimed are defined as follows:

1. A process for consolidating the near-bore region of an unconsolidated subterranean reservoir containing reservoir fluid and being formed by discrete sand or gravel particles having communicating fluid flow channels extending therebetween to provide fluid flow permeability, comprising:

(a) emplacing a liquid slug of a first solution in the near-bore region, said solution comprising a linear polymer dissolved in a good solvent for the polymer;

(b) then Injecting a liquid slug of a poor solvent for the polymer, said poor solvent being miscible in the good solvent, into the near-bore region to contact the first slug and precipitate linear polymer to consolidate the particles of the near-bore region while retaining sufficient residual permeability to enable production of the reservoir fluid;

the solvents and polymer having been selected on the following basis:
 (i) the good solvent being substantially non-reactive with the polymer,
 (ii) the polymer being non-miscible with water and with petroleum and substantially non-reactive with the reservoir solids and fluids,
 (iii) the combination of solvents and polymer used being operative to form a three-dimensional network of interconnected strands in a sand sample, said strands extending through fluid flow channels in the sample.

2. The process as set forth in claim 1 wherein:
the good solvent is morpholine;
the polymer is polysulfone; and
the polymer is provided in an amount of 2.5 to 25% by weight of the first solution.

* * * * *